F. H. MASOW.
NUT LOCK.
APPLICATION FILED AUG. 10, 1912.

1,053,104.

Patented Feb. 11, 1913.

Witnesses.
C. O. Bean
J. M. Morrison

Inventor
Frank H. Masow.
By G. H. Strong, Atty

UNITED STATES PATENT OFFICE.

FRANK H. MASOW, OF SAN FRANCISCO, CALIFORNIA.

NUT-LOCK.

1,053,104.

Specification of Letters Patent.  Patented Feb. 11, 1913.

Application filed August 10, 1912. Serial No. 714,374.

*To all whom it may concern:*

Be it known that I, FRANK H. MASOW, a citizen of the United States, residing in the city and county of San Francisco and State of California, have invented new and useful Improvements in Nut-Locks, of which the following is a specification.

This invention relates to a nut lock.

It is the object of this invention to provide a device for locking nuts on bolts to prevent their being loosened.

A further object is to provide a nut lock which is particularly adapted for use in railroad construction, and which is especially designed to prevent the nuts from being loosened on the bolts by the vibration of the tracks, as occasioned by the passage of trains thereover, or from other accidental causes.

Another object is to provide a nut lock which can be readily disengaged to permit the nut being removed when desired.

The invention primarily resides in a washer having means for engaging it with the surface surrounding the bolt on which it is placed to prevent its turning thereon, and a plate-ring surrounding the bolt having means for connecting it to the washer and for engaging it with a nut screwed on the bolt to prevent turning of the latter in one direction.

The invention further consists of the parts and the construction and combination of parts as hereinafter more fully described and claimed, having reference to the accompanying drawings, in which—

Figure 1:
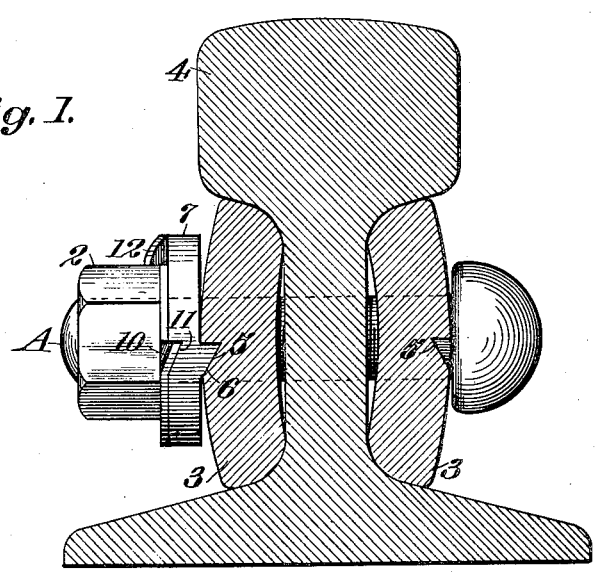
Figure 2:
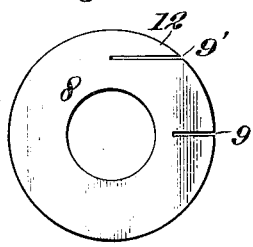
Figure 3:
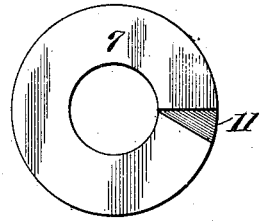
Figure 4:
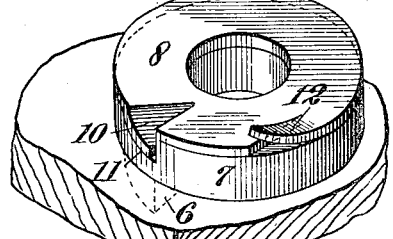
Figure 5:
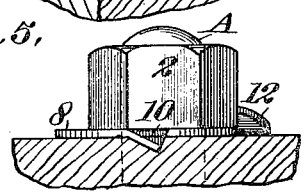

Figure 1 is a vertical section of a railroad rail, showing the invention as applied in side elevation. Fig. 2 is a detail plan view of the plate-ring blank. Fig. 3 is a detail plan view of the nut washer. Fig. 4 is a detail in perspective of the nut and nut lock. Fig. 5 is a view showing a modified form of the invention.

In the drawings A represents a bolt and 2 indicates a nut which is adapted to be screwed on the bolt A in the usual manner. The bolt A and the nut 2, here shown, are those commonly employed in railroad construction in bolting fish-plates 3 to the abutting ends of the railroad rails 4.

In carrying out this invention, the fish-plates 3 are formed with longitudinally extending grooves 5 which extend from the usual perforations formed in the fish-plates for the reception of the bolts A; the grooves 5 being provided as a means for engaging a projection 6 on the underside of a washer 7 which is designed to be placed on the bolt A between the nut 2 and the fish-plate 3. The groove 5 is formed with one vertical wall and one inclined wall, and the projection 6 on the washer 7 is shaped to correspond; the vertical walls of the groove 5 and projection 6 being so arranged that when the washer is on the bolt and engaged with the fish-plate, and the nut 2 is screwed on the bolt, the projection 6 will abut against the vertical wall of the groove and prevent the washer 7 being rotated in the direction traversed by the nut when it is turned to unscrew it from the bolt, as will be presently described.

The nut-engaging means consists of a plate-ring 8 which is formed with slots 9 and 9′, as shown in Fig. 2; the material forming one wall of the slot 9 being bent downward to form a tongue 10 which is adapted to extend into a notch 11 formed in the outer face of the washer 7, when the plate-ring 8 is placed thereagainst, as shown in Figs. 1 and 4.

In the application of this invention the bolt A is passed through the fish plates 3 and rail 4 in the usual manner. The washer 7 is then placed on the bolt A, with the projection 6 thereon extending into the groove 5 on the fish-plate 3 adjacent thereto. The plate-ring 8 is then positioned on the bolt A adjacent to the washer 7 and with the tongue 10 extending into the notch 11. The nut then being screwed on the bolt A and drawn tight against the plate-ring 8, the tongue 12, formed by the material of the plate-ring adjacent to the slot 9′, is turned outwardly alongside of one of the flat sides of the bolt, as shown in Fig. 1; the flat side of the tongue 12 extending parallel with the flat side of the nut, thereby effectively locking the latter against being unscrewed. When it is desired to remove the nut 2, the tongue 12 is depressed so as to allow the nut to be turned thereover.

It will be observed that when the nut 2 is tightened on the bolt A, the washer 7 and the plate-ring 8 will be prevented from turning with the nut by reason of the projection 6 on the washer 7 engaging the fish-plate 3, and the tongue 10 on the plate-ring 8 engaging the notch 11 on the washer 7, and that any tendency of the nut to come unscrewed will be prevented by reason of the projection 6 engaging the vertical wall of the groove 5, and the tongue 10 engaging the vertical wall of the notch 11, thus making the washer and plate rigid so that the tongue 12 will be effective in preventing the nut being turned in the unscrewing direction.

The use of the washer 7 is particularly advantageous when it bears against a compressible material, such as a timber, in which event the projection 6 acts as a spur and is forced into the timber, as shown in dotted lines in Fig. 4. In some instances the washer 7 may be entirely dispensed with; the plate-ring 8 being alone employed, and then serving as a combined washer and nut lock, in which case the tongue will be engaged with any surface against which the underside of the plate may contact.

Having thus described my invention, what I claim and desire to secure by Letters Patent is—

An arched fish plate for railway rail joints having a bolt hole intermediate of its upper and lower edges, and a longitudinal, shouldered groove on the crown of the arch, a rigid washer perforated to fit the bolt and having a solid integral spur to engage the groove in the fish plate, and a corresponding radial, shouldered notch in its opposite surface, a second washer slotted to form a turned down lip to engage said notch and slotted to form an upturned lip, and a nut adapted to screw upon the bolt and be engaged by said upturned lip.

In testimony whereof I have hereunto set my hand in the presence of two subscribing witnesses.

FRANK H. MASOW.

Witnesses
  C. O. BEAN,
  J. M. MORRISON.